United States Patent
Beyer et al.

(10) Patent No.: US 6,867,521 B2
(45) Date of Patent: Mar. 15, 2005

(54) VACUUM CONDUIT

(75) Inventors: Christian Beyer, Köln (DE); Josef Hodapp, Köln (DE); Heinrich Englander, Linnich (DE)

(73) Assignee: Leybold Vakuum GmbH, Cologne (DE)

( * ) Notice: Subject to any disclaimer, the term of this patent is extended or adjusted under 35 U.S.C. 154(b) by 0 days.

(21) Appl. No.: 10/474,498

(22) PCT Filed: Apr. 4, 2002

(86) PCT No.: PCT/EP02/03743
§ 371 (c)(1),
(2), (4) Date: Oct. 17, 2003

(87) PCT Pub. No.: WO02/086325
PCT Pub. Date: Oct. 31, 2002

(65) Prior Publication Data
US 2004/0135449 A1 Jul. 15, 2004

(30) Foreign Application Priority Data
Apr. 19, 2001  (DE) .......................... 101 19 075

(51) Int. Cl.⁷ ............................................... H02K 7/09
(52) U.S. Cl. ...................................................... 310/90.5
(58) Field of Search ....................................... 310/90.5

(56) References Cited

U.S. PATENT DOCUMENTS

| | | | | |
|---|---|---|---|---|
| 4,268,769 A | * | 5/1981 | Dorner et al. ............ | 310/67 R |
| 4,609,332 A | | 9/1986 | Miki et al. ................... | 417/352 |
| 4,795,927 A | | 1/1989 | Morii et al. ................ | 310/90.5 |
| 5,059,092 A | | 10/1991 | Kabelitz et al. .............. | 415/90 |
| 6,184,640 B1 | * | 2/2001 | Kawashima ................. | 318/461 |

FOREIGN PATENT DOCUMENTS

| | | | |
|---|---|---|---|
| DE | 10001 509 | 7/2001 | |
| DE | 10043 235 | 3/2002 | |
| JP | 62233494 A | * 10/1987 | ........... F04D/19/04 |
| JP | 10252963 | 9/1998 | |
| JP | 11210455 | 8/1999 | |

* cited by examiner

*Primary Examiner*—Thanh Lam
(74) *Attorney, Agent, or Firm*—Fay, Sharpe, Fagan, Minnich & McKee, LLP

(57) ABSTRACT

A vacuum line (10) comprising a vacuum-tight flexible tube section (22) and a vibration damper (16) axially parallel to the flexible tube section (22) serves to connect tow vacuum devices (12, 14). The vibration damper (16) is an actively regulated axial magnetic bearing. Thereby, a vibration damper with good dampening properties is realized. By changing the regulation parameters, the vibration damper is adaptable and not subjected to any mechanical wear. The transmission of structure-borne noise is avoided by the contactless vibration dampening.

14 Claims, 3 Drawing Sheets

VACUUM CONDUIT

BACKGROUND OF THE INVENTION

The invention relates to a vacuum line with a vibration damper, serving to connect two vacuum devices.

During operation, vacuum pumps, high-speed turbomolecular pumps in particular, produce inevitable vibrations. By a vacuum line, the vacuum pump is connected with another vacuum device, e.g., with a sensitive analyzing apparatus, an electron microscope or the like. In case of a high sensitivity of the connected vacuum device to vibrations and shocks, the connecting vacuum line comprises a vibration damper widely avoiding the transmission of vibrations from the vacuum pump to the connected vacuum device. Such vibration dampers comprise a bellows-like resilient body forming the vacuum tube encompassed by an elastomeric damping jacket. The resilience and dampening behavior of the vibration damper is structurally fixed and cannot be changed later on just like that. An adaptation of the vibration damper behavior to the vibration conditions at the installation site cannot be effected in the installed state any more. The resilient body and the dampening jacket have a certain stiffness so that a transmission of vibrations and structure-borne noise by the resilient body and the dampening jacket cannot be completely avoided.

Therefore, it is an object of the invention to provide a vacuum line with an improved vibration damper.

SUMMARY OF THE INVENTION

According to a preferred embodiment, the vibration damper is an actively controlled axial magnetic bearing. The magnetic bearing has both resilient and dampening properties so that a mechanical resilient element as well as a mechanical dampening device can be omitted. In a preferred embodiment, the mechanical connection between two vacuum devices can therefore be restricted to a thin-walled flexible tube section by which vibrations between the vacuum devices can only be transmitted to a small extent. Even in the installed state, the resilience and dampening parameters of the active magnetic bearing can be changed any time so that in the assembled state, the matching of the magnetic bearing can be adapted or changed in situ any time. This also permits the exchange and further use of the magnetic bearing vibration damper at another vacuum pump. By configuring the vibration damper as an actively controlled magnetic bearing, an almost complete mechanical decoupling of two vacuum devices from each other can be realized. Thereby, the almost vibration-free realization of processes in the vacuum is made possible.

According to a preferred embodiment, the magnetic bearing comprises a magnet coil generating an axial magnetic field and axially opposite thereto a permanently axially magnetized main magnet, a regulating means for controlling the magnet coil being provided. By changing the flux direction of the current flowing through the magnet coil, an attracting or repelling force can be generated on the axially opposite main magnet. The regulating means controls the magnet coil such that the attracting force of the main magnet upon the yoke surrounding the magnet coil approximately corresponds to the weight force of the vacuum pump. The distance between the magnet coil and the main magnet always remains about the same, vibrations being simultaneously transmitted to an as small extent as possible. In this manner, a regulated axial magnetic bearing is simply realized, which has resilient as well as dampening properties and ensures a good mechanical decoupling of the vacuum devices connected with each other by the vacuum line. Due to the fact that the weight force is compensated for by the attracting force of the main magnet, the current and power requirement of the magnetic bearing remains small.

According to a preferred embodiment, an axial distance sensor for measuring the axial distance of the two axial ends of the tube section is provided, the axial distance sensor being connected with the control device and the control device controlling the magnet coil in dependence on the measured axial distance.

According to a preferred embodiment, a yoke iron for concentrating the magnetic field generated by the magnet coil is provided axially opposite to the main magnet. By concentrating the magnetic field, the leakages are kept as small as possible, the efficiency of the magnetic bearing is improved and the accuracy of the regulation and thus the quality of the decoupling is improved.

According to a preferred embodiment, a permanently axially magnetized counter magnet cooperating with the magnetic field of the main magnet is provided on the part of the magnet coil. The counter magnet is polarized in the opposite direction and arranged approximately axially to the main magnet so that the main magnet and the counter magnet repel each other. Further, the attraction between the main magnet and the axially opposite yoke iron is counteracted. The ratio of the dimension of the main magnet to that of the counter magnet is selected such that the weight force of the vacuum pumps provided for the vacuum line is applied onto the yoke of the magnet coil by the resulting force of the main magnet. Thereby, an axial bias of the dampening device is avoided. Therefore, a corresponding bias equalization of the dampening device can be omitted. This permits the use of relatively small magnet coils. Further, the heat produced by the magnet coil is considerably reduced.

According to a preferred embodiment, an eddy current dampening disc of electrically conducting material is arranged axially between the main magnet and the magnet coil on the part of the magnet coil. The dampening disc effects a dampening of radial movements due to the eddy currents induced in the dampening disc when radial movements occur. Thus, an effective radial dampening is realized which can be provided as an alternative or in addition to an active dampening of radial movements and/or tilting movements.

According to a preferred embodiment, the magnetic bearing has an annular configuration, the main magnet, the counter magnet, the yoke iron and the magnet coil being arranged about the tube section like an annular circle. Due to the fact that the magnetic bearing is arranged radially outside the tube section and not axially annexed to the tube section, a short overall length of the vacuum line with vibration damper is made possible.

Preferably, several magnet coils adapted to be driven separately are annularly arranged about the tube section for compensating for tilting moments. Preferably, several axial distance sensors connected with the control device are provided for the detection of tilting movements. The magnet coil and the counter and main magnets lie approximately in a transverse plane whereby the overall length of the dampening device is kept small.

According to a preferred embodiment, the pole surfaces of the magnetic poles standing opposite each other do not lie in the transverse plane, but the pole surfaces and the air gap between the pole surfaces, i.e., between the yoke iron and the main magnet, are inclined to the transverse plane. Thereby, the surface of the air gap interspersed by the magnetic field is enlarged so that the use of larger or stronger main and counter magnets, respectively, is made possible. Further, a radial magnetic force component is generated by the inclination of the air gap so that an active radial dampening can also be realized in addition to the axial one. Therefore, preferably several radial distance sensors for detecting radial movements are provided for a corresponding regulation.

Preferably, the tube section is configured as a bellows. The bellows is configured as elastic as possible, in the form of a thin-walled metal bellows, for example. Thereby, it is ensured that the bellows virtually transmits no structure-borne noise or other vibrations between two connected vacuum devices. The bellows exclusively serves the vacuum-tight sealing and has no resilient or dampening effect any more. For restraining the stroke of the bellows at greater pressures within the bellows, a stroke limiter is preferably provided parallel to the tube section, limiting the axial expansion of the bellows.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
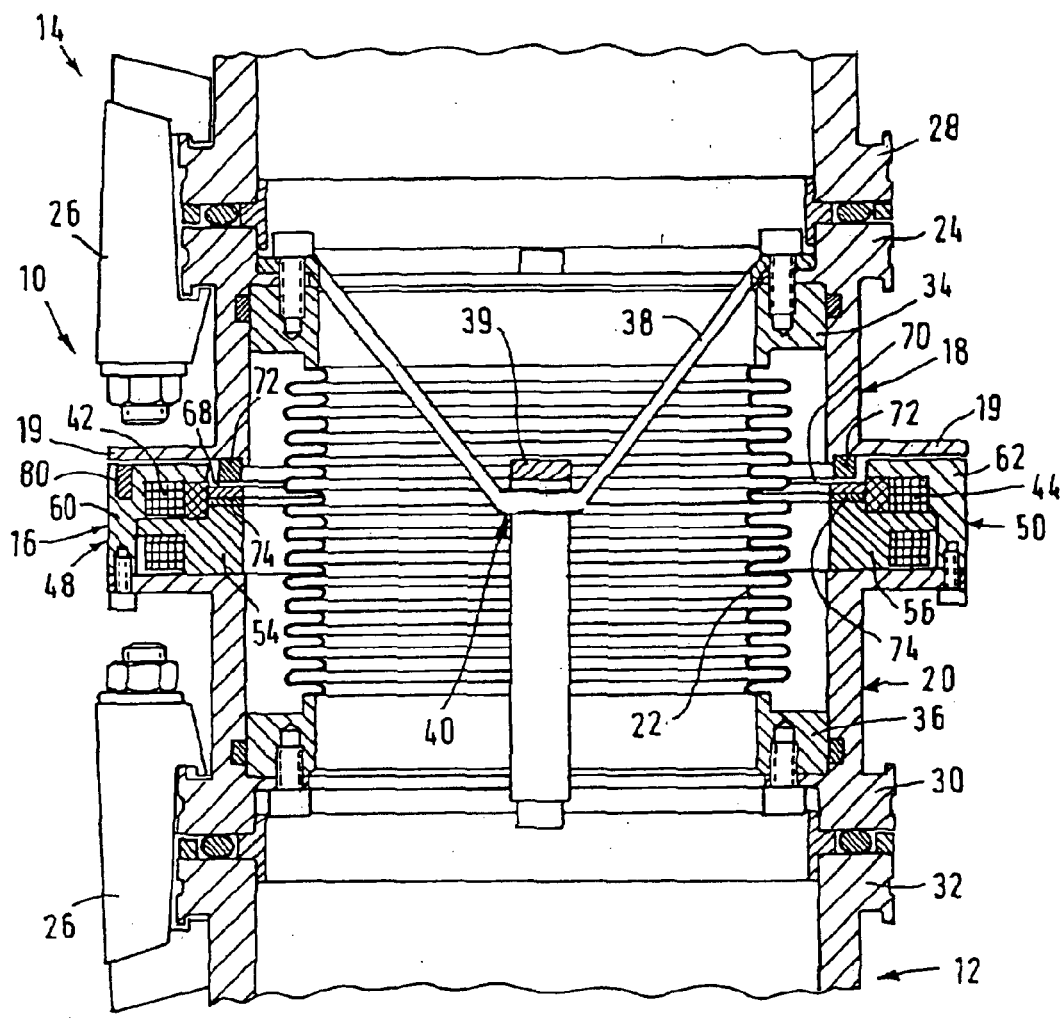
FIG. 1 shows a vacuum line with vibration damper of a first embodiment in longitudinal section.

In FIG. 1, a first embodiment of a vacuum line 10 between a first vacuum device configured as a turbomolecular vacuum pump 12 and a second vacuum device 14 configured as a recipient 14 is illustrated. The vacuum pump 12, which is not completely shown, hangs at the not completely illustrated recipient 14 via the vacuum line 10.

The recipient 14 is a measuring chamber of an analyzing apparatus, an electron microscope or another shock-sensitive apparatus. The resolution and measuring accuracy of such sensitive apparatus is considerably worsened by shocks and vibrations.

The turbomolecular vacuum pump 12 is operated at speeds up to 80,000 rpm, even minor balance errors of the pump rotor leading to disturbing vibrations. In order to avoid the transmission of these vibrations from the vacuum pump 12 to the recipient 14, the recipient 14 is mechanically decoupled from the vacuum pump 12 by a vibration damper 16 allocated to the vacuum line 10.

The vacuum line 10 is substantially formed by an upper housing portion 18, by a lower housing portion 20, the vibration damper 16 between the two housing portions 18,20 and a flexible tube section formed by a gas- and vacuum-tight metal bellows 22. At its upper end, the upper housing portion 18 comprises a mounting flange 24. The mounting flange 24 of the upper housing portion 18 is connected with a recipient flange 28 in a firm and vacuum-tight manner by several clamping screws 26. Similarly, a mounting flange 30 of the lower housing portion 20 is vacuum-tightly connected with a pump flange 32 of the vacuum pump 12 by means of several clamping screws 26.

Within the space enclosed by the two housing portions 18,20, the bellows 22 is arranged and screwed with the two mounting flanges 24,30 in a firm and vacuum-tight manner by means of its two axial bellows flanges 34,36. The stiffness of the bellows 22 is selected as low as possible in order to keep the transmission of vibrations via structure-borne noise through the bellows 22 as minor as possible. Two approximately V-shaped steel sheets 38,39 engaging into each other with their closed ends form a stroke limiter 40 by which the stroke, i.e., the axial extension of the vacuum line 10 and the bellows 22, respectively, is limited, e.g., at a relatively high pressure within the bellows 22.

Figure 3:
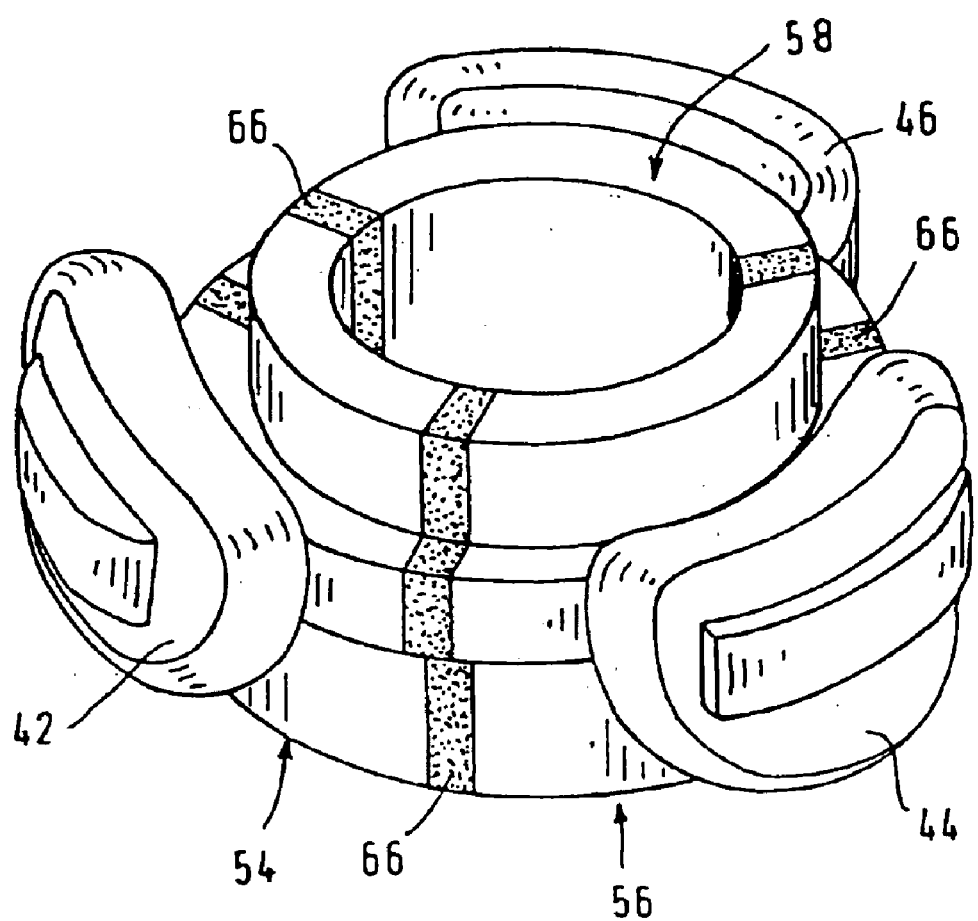
FIG. 3 shows three magnet coils with associated yoke irons of the vibration damper of FIG. 1.

The vibration damper 16 is an actively regulated axial magnetic bearing and comprises three magnet coils 42,44,46 each of which generates a toroidal magnetic field and is penetrated and surrounded by a ferromagnetic yoke iron 48,50. Each of the three yoke irons 48,50 substantially consists of yoke iron inner sections 54,56,58, as illustrated in FIG. 3, and yoke iron outer sections 60,62 that are approximately L-shaped in cross section. Between the yoke iron inner sections 54,56,58 extending in a segment of about 120°, a separating disc 66 of non-ferromagnetic material is respectively provided which magnetically separates the yoke iron inner sections 54,56,58 from each other. Each of the yoke irons 48,50 forms a frame that is rectangular in cross section and interrupted, i.e., open, at a radially inner corner and forms an air gap 68,70 there. The yoke iron 48,50 consists of an iron composite material with a plastic proportion of about 5%, whereby the induction of eddy currents is kept low and the regulation of the magnetic bearing 16 is accelerated. Stainless steels adapted to be magnetized are also usable to form the yoke iron. At the upper housing portion 18, an axially magnetized annular permanent magnet is mounted opposite the one end of the yoke iron and separated therefrom by the air gap 68,70. The magnetic field produced by the magnet coils 42,44,46 has an attracting or repelling effect upon the main magnet 72 in axial direction, depending on the polarization of the magnetic field generated by the magnet coil 42,44,46, i.e., depending on the current direction in the magnet coil 42,44,46.

At the axial front end of the one open yoke iron end, an axially magnetized annular permanent magnet is mounted as a counter magnet 74, which is polarized in opposite direction to the main magnet 72, so that the main magnet 72 and the counter magnet 74 repel each other. Thus, the magnetic attraction forces generated between the main magnet 72 and the yoke iron 48,50 are compensated for by approximately correspondingly great repulsive forces between the main magnet 72 and the counter magnet 74. By the provision of the counter magnet 74, the regulation of the axial position about an approximately bias-free axial central position can be effected. Therefore, only relatively small regulating forces are required for regulating the axial central position. This permits small magnet coils 42,44,46. Further, the heat generation is also limited by the relatively little regulating power required.

A circular eddy current dampening disc 76 of an electrically well-conducting material, e.g., copper, is mounted axially in front of the counter magnet 74. This means that the dampening disc 76 lies axially between the main magnet 72 and the counter magnet 74, the air gap 68,70 being arranged between the dampening disc 76 and the main magnet 72. In case of radial movements and vibrations of the vacuum pump 12, electric eddy currents are induced in the dampening disc 76 by the main magnet 72. Thereby, the mechanical momentum of the vacuum pump 12 is inductively transferred to the dampening disc 76 and translated into heat there. Thus, radial movements and vibrations of the vacuum pump 12 are dampened as well and nevertheless transferred to the recipient 14 to a small extent only.

In the region of the yoke iron 48,50, three axial distance sensors 80 are arranged opposite to the annular flange 19 of the upper housing portion 18 and separated therefrom by the air gap 68,70, by means of which the axial distance of the yoke iron 60,62 of the lower housing portion 20 from the annular flange 19 of the upper housing portion 18 is measured. The distance sensor 80 is an inductive sensor transmitting a distance signal to a non-illustrated control device. By the provision of three distance sensors 80 in all which are equally distributed about the circumference, tilting movements between the vacuum pump 12 and the recipient 14 are detected as well and can be compensated for by a corresponding control of the magnet coils 42,44,46 by means of the control device or their transmission from the vacuum pump 12 to the recipient 14 can be avoided.

Figure 2:
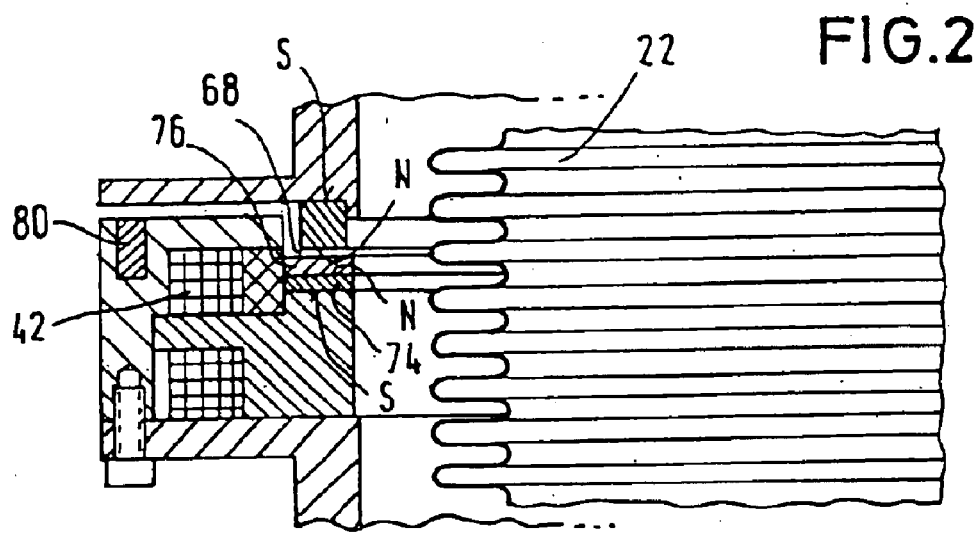
FIG. 2 shows an enlarged representation of the vibration damper of the vacuum line of FIG. 1.
Figure 4:
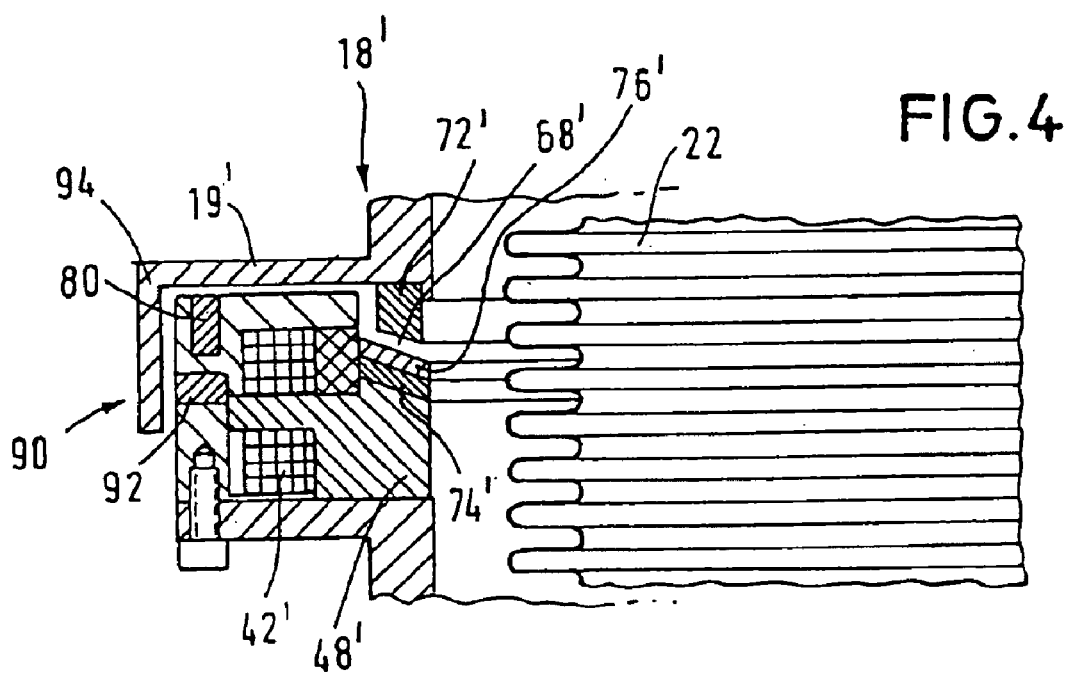
FIG. 4 shows an enlarged representation of a second embodiment of a vibration damper with inclined pole surfaces and air gap.

In the second embodiment of a dampening device 90 illustrated in FIG. 4, the main magnet 72', the counter magnet 74', the dampening disc 76' and thus the air gap 68' as well do not lie in a transverse plane in a disc-shaped manner, but are inclined to the transverse plane in an angle of about 15° so that the angle α of the air gap 68' to the longitudinal axis is not 90° as in the first embodiment illustrated in FIGS. 1–3 but amounts to about 75°. In addition to the three axial distance sensors 80, three radial distance sensors 92 are arranged so as to be equally distributed over the circumference. The radial distance sensors 92, which are also configured as inductive sensors, detect the radial distance with respect to a cylindrical jacket 94 annexed at the outer circumference of the annular flange 19' of the upper housing portion 18'. Due to the inclination of the air gap 68', the permanent magnets 72',74' as well as the cross-sectional area of the yoke irons 48' can be enlarged so that the magnetic forces generated and able to be generated can be increased thereby as well. By the inclination of the air gap 68', the magnetic forces transmitted vertically to the air gap plane are further divided into both an axial and a (smaller) radial component. By a suitable regulation and control of the magnet coils 42', the axial position as well as the radial position of the recipient 14 with respect to the vacuum pump 12 can be regulated. Thus, it is not only possible to limit the transmission of axial vibrations and shocks, but also the transmission of radial vibrations and shocks from the vacuum pump 12 to the recipient 14 to a minimum.

In the non-illustrated control device, regulating algorithms and/or tables are deposited which provides for a drive of the magnet coils 42–46; 42' for each vibrational situation, by which a transmission of the vacuum pump vibrations to the recipient is widely avoided.

In a simple non-illustrated embodiment, it is also possible to provide only a single concentric magnet coil extending over the entire circumference in a closed circle. With such an arrangement, however, a dampening can only be realized in axial direction but no dampening of tilting moments or radial movements can be realized. Basically, a vibration damper can also be realized without providing a counter magnet or a dampening disc.

The permanent magnets, i.e., the main and counter magnets, may also be arranged radially outside the magnet coil. On the whole, this arrangement permits larger permanent magnets generating greater magnetic forces.

By using actively regulated electromagnetic vibration dampers, the transmission of vibrations from the vacuum pump to a connected vacuum device is minimized. This permits the use of vacuum pumps of lesser vibrating quality and improves the freedom of vibrations of the connected vacuum device, respectively. This, in turn, permits higher resolutions and more accurate measuring results, respectively, in sensitive analyzing apparatus communicating, e.g., with a connected recipient.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A vacuum line for connecting two vacuum devices comprising:
    a vacuum-tight flexible tube section; and
    a vibration damper axially parallel to the flexible tube section, the vibration damper including an actively controlled axial magnetic bearing.

2. The vacuum line according to claim 1, wherein the magnetic bearing comprises:
    a magnet coil generating an axial magnetic field and axially opposite thereto,
    a permanently axially magnetized main magnet, and,
    a control device for controlling the magnet coil.

3. The vacuum line according to claim 2, wherein the vibration damper comprises:
    an axial distance sensor for measuring the axial distance of axial ends of the tube section, the axial distance sensor being connected with the control device and the control device controlling the magnet coil in dependence on the measured axial distance.

4. The vacuum line according to claim 2, further including a yoke iron for concentrating the magnetic field generated by the magnet coil, the yoke iron being disposed axially opposite to the main magnet.

5. The vacuum line according to claim 2, further including:
    a permanently axially magnetized counter magnet cooperating with a magnetic field of the main magnet mounted with the magnet coil.

6. The vacuum line according to claim 2, further including:
    an eddy current dampening disc of electrically conducting material arranged axially between the main magnet and the magnet coil.

7. The vacuum line according to claim 5, wherein the magnetic bearing has an annular configuration, and the main magnet, the counter magnet, yoke irons, and the magnet coils are arranged annularly about the tube section (22).

8. The vacuum line according to claim 2, further including:
    additional magnet coils adapted to be driven separately arranged about the tube section in a ring-like manner to compensate for tilting moments.

9. The vacuum line according to claim 2, further including:
   a plurality of axial distance sensors for detecting tilting movements and a plurality of radial distance sensors for detecting radial movements, the axial and radial distance sensors being connected with the control device.

10. The vacuum line according to claim 5, wherein the magnet coil is arranged radially inside or outside the main and counter magnets.

11. The vacuum line according to claim 4, wherein an air gap between the yoke iron and the main magnet is inclined relative to a transverse plane.

12. The vacuum line according to claim 1, further including:
   a plurality of radial distance sensors.

13. The vacuum line according to claim 1, wherein the tube section is configured as bellows.

14. The vacuum line according to claim 13, further including:
   a stroke limiter is disposed axially parallel to the tube section.

* * * * *